(12) United States Patent
Huddy et al.

(10) Patent No.: US 12,236,542 B1
(45) Date of Patent: Feb. 25, 2025

(54) GEO-SPATIAL AR CONTENT ANCHORING AND NFT MINTING SYSTEM AND ASSOCIATED PROCESSES

(71) Applicants: Jason Kristopher Huddy, Valley Village, CA (US); Brandon Martin, Hoboken, NJ (US)

(72) Inventors: Jason Kristopher Huddy, Valley Village, CA (US); Brandon Martin, Hoboken, NJ (US)

( * ) Notice: Subject to any disclaimer, the term of this patent is extended or adjusted under 35 U.S.C. 154(b) by 155 days.

(21) Appl. No.: 18/119,496

(22) Filed: Mar. 9, 2023

Related U.S. Application Data

(60) Provisional application No. 63/318,286, filed on Mar. 9, 2022.

(51) Int. Cl.
*G06T 19/00* (2011.01)
*G06Q 30/0601* (2023.01)

(52) U.S. Cl.
CPC ....... *G06T 19/006* (2013.01); *G06Q 30/0601* (2013.01)

(58) Field of Classification Search
None
See application file for complete search history.

(56) References Cited

U.S. PATENT DOCUMENTS

| 2023/0009304 A1* | 1/2023 | Jakobsson | G06Q 30/0241 |
| 2023/0154110 A1* | 5/2023 | Stout | G06T 17/20 345/156 |
| 2023/0252431 A1* | 8/2023 | Mecci | G06Q 50/184 705/44 |

\* cited by examiner

*Primary Examiner* — Tapas Mazumder
(74) *Attorney, Agent, or Firm* — Plager Schack LLP; Mark H. Plager, Esq.; Stephen Hallberg, Esq.

(57) ABSTRACT

A geo-spatial augmented reality (AR) content anchoring and non-fungible token (NFT) minting system and associated processes are disclosed for linking one or more user-owned AR content item(s) to a particular geo-spatial location by NFT and blockchain technology. The geo-spatial AR content anchoring and NFT minting system and processes provide geo-spatial location NFT minting ("geo-minting") and geo-spatial location NFT storage ("geo-storage") on blockchain technology. The geo-spatial AR content anchoring and NFT minting system and processes support a process for re-addressing of NFT geo-storage by way of a location indexing system that aggregates NFTs of user-owned AR content within a perimeter, a defined circumference, or an area encapsulated within a circular boundary defined by a radial distance. The geo-spatial AR content anchoring and NFT minting system and processes also support merged NFTs and evolutionary NFTs.

1 Claim, 8 Drawing Sheets

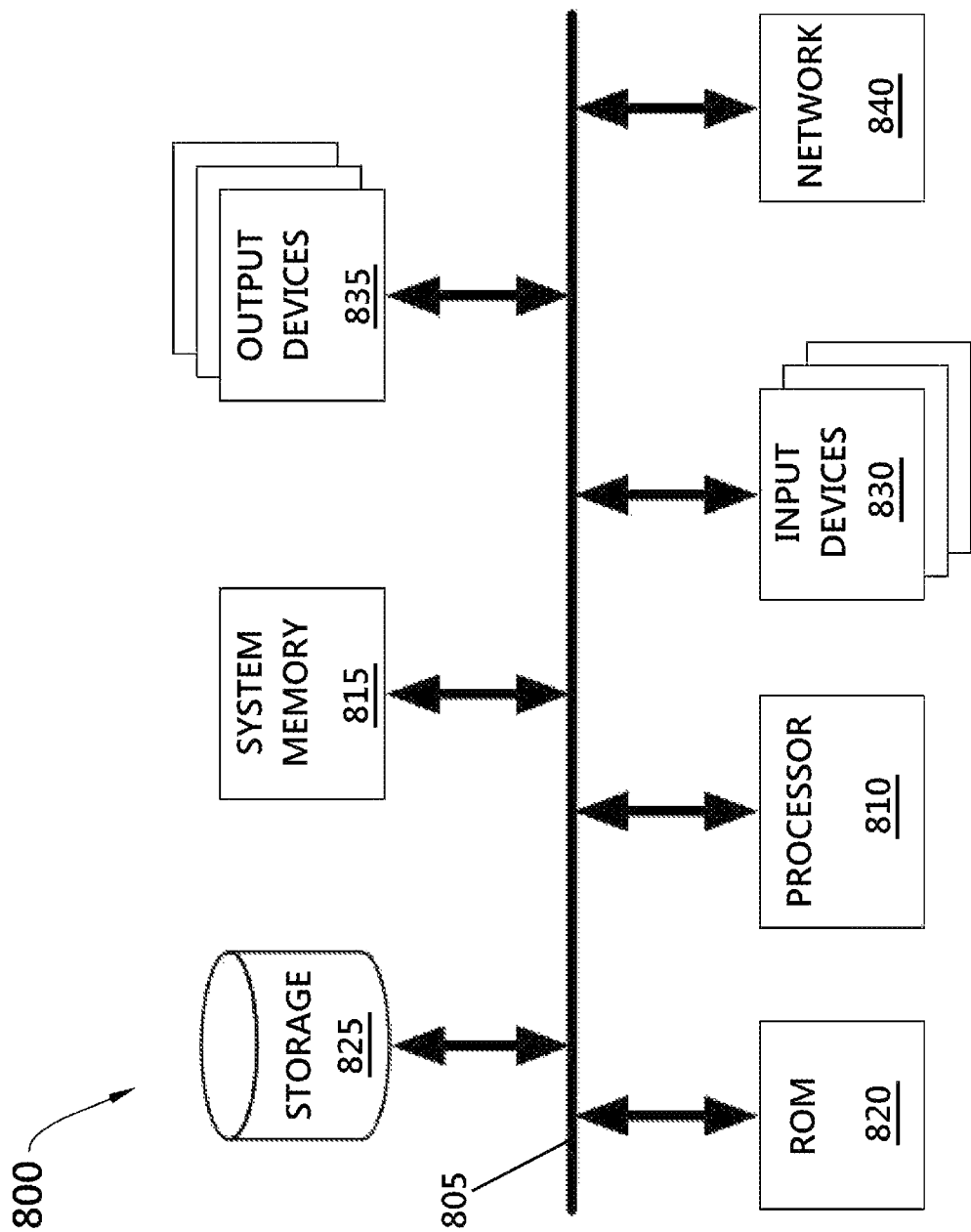

GEO-SPATIAL AR CONTENT ANCHORING AND NFT MINTING SYSTEM AND ASSOCIATED PROCESSES

CLAIM OF BENEFIT TO PRIOR APPLICATION

This application claims benefit to U.S. Provisional Patent Application 63/182,286, entitled "NFT-BASED AR CONTENT OWNERSHIP AND GEO-SPATIAL ANCHORING SYSTEM AND PROCESS FOR LINKING A USER-OWNED AR CONTENT ITEM TO A PARTICULAR GEO-SPATIAL LOCATION BY NFT AND BLOCKCHAIN TECHNOLOGY," filed Mar. 9, 2022. The U.S. Provisional Patent Application 63/182,286 is incorporated herein by reference.

BACKGROUND

Embodiments of the invention described in this specification relate generally to blockchain-based non-fungible token (NFT) minting for augmented reality (AR) content, and more particularly, to a geo-spatial AR content anchoring and NFT minting system and associated processes.

As mass adoption approaches for the NFT web-based marketplace, the scarcity of an NFT will become less so, creating low consumer demand and ultimately driving down the intrinsic value of NFTs.

Current NFT minting and purchasing platforms lack immersive software and hardware technologies and do not mint, data-store and/or transact on a geo-locational basis but rather utilize desktop and/or mobile websites, webapps and/or native apps.

Therefore, what is needed is NFT geo-minting and NFT geo-storage solutions that will create scarcity within the NFT marketplace by allowing creators and collectors to mint, transact, and collect on a location basis, rather than just over the Internet and a way for users to view, mint, interact, collect, and/or transact with immersive content associated with specific NFTs that are anchored to the locations.

BRIEF DESCRIPTION

A novel geo-spatial AR content anchoring and NFT minting system and associated processes are disclosed for linking one or more user-owned AR content item(s) to a particular geo-spatial location by NFT and blockchain technology. In some embodiments, the geo-spatial AR content anchoring and NFT minting system and associated processes support geo-spatial location NFT minting ("geo-minting") and geo-spatial location NFT storage ("geo-storage") on blockchain technology. In some embodiments, the geo-spatial AR content anchoring and NFT minting system comprises a geolocational AR content anchoring NFT minting and storage platform, a geolocational AR content anchoring NFT minting and storage software application (or " . . . user application", " . . . user app", " . . . user program", " . . . user software", etc.) through which users engage and interact with the geolocational AR content anchoring NFT minting and storage platform, a blockchain, a media server, and an automated notification system. In some embodiments, the geo-spatial AR content anchoring and NFT minting system further comprises a location indexing system.

In some embodiments, the associated geo-spatial AR content anchoring and NFT minting processes comprise (i) a geo-spatial AR content anchoring and NFT minting process, (ii) a cross-pollination process for combining, merging, or cross-pollinating smart contracts and content from a plurality of existing NFTs into a newly minted merged NFT on the blockchain, (iii) an autonomous evolutionary NFT modifier process for permanently changing visual or audible appearance of the NFT as it passes from one owner to another owner (for both newly minted geo-spatial AR content anchored and minted NFTs and cross-pollinated merged geo-spatial AR content anchored and minted NFTs), and (iv) a location indexing and re-addressing process for re-addressing of NFT geo-storage.

In some embodiments, the geo-spatial AR content anchoring and NFT minting process comprises (i) creating, by a creator user with a registered user profile on the geolocational AR content anchoring NFT minting and storage platform, AR media associated with a specific geo-spatial location as determined by GPS location data when the creator user is at the specific geo-spatial location, (ii) anchoring the AR media to the specific geo-spatial location based on the GPS location data, (iii) uploading, based on interactions of the creator user in the geolocational NFT minting and storage user application, the location-anchored AR media to the media server, (iv) executing a blockchain smart contract on the location-anchored AR media to mint an AR geolocational NFT and record the AR geolocational NFT on the blockchain, (v) adding the minted AR geolocation NFT to a digital wallet of the creator user, (vi) displaying, in a social forum of the geolocational AR content anchoring NFT minting and storage platform and in connection with the user profile of the creator user, identifying information about the minted AR geolocation NFT, (vii) adding the GPS location data and identifying information about the minted AR geolocation NFT to a notification list of an automated notification system that is configured to send notifications to devices of registered users when any such registered user is nearby the specific location, where the notification alerts the registered user to the existence of the minted AR geolocation NFT, and (viii) enabling a plurality of public interaction tools that allow all registered users to interact with the minted AR geolocation NFT on the geolocational AR content anchoring NFT minting and storage platform. In some embodiments, the plurality of public interaction tools comprises a commenting tool configured to allow users to comment on the minted AR geolocation NFT, a bidding tool configured to allow users to make purchase bids to acquire the minted AR geolocation NFT, and a purchasing tool configured to allow users to purchase the minted AR geolocation NFT with or without bidding.

In some embodiments, the geo-spatial AR content anchoring and NFT minting system supports merged NFTs. In some embodiments, a merged NFT is created by way of the cross-pollination process for combining, merging, or cross-pollinating smart contracts and content from a plurality of existing NFTs into a newly minted merged NFT on the blockchain. In some embodiments, the cross-pollination process applies to both geo-spatial AR content anchored and minted NFTs and conventional NFTs that are not necessarily anchored to a geolocation.

In some embodiments, the geo-spatial AR content anchoring and NFT minting system supports evolutionary NFTs. In some embodiments, an evolutionary NFT is based on an original NFT that is changed by the autonomous evolutionary NFT modifier process for permanently changing visual or audible appearance of the NFT as it passes from one owner to another owner. In some embodiments, the autonomous evolutionary NFT modifier process applies to both geo-spatial AR content anchored and minted NFTs and merged NFTs. In some embodiments, the autonomous evolutionary NFT modifier process applies to conventional and existing NFTs that are not necessarily anchored to a geolocation.

In some embodiments, the location indexing and re-addressing process performs re-addressing of NFT geo-storage by way of a location indexing system. In some embodiments, the location indexing and re-addressing process performs re-addressing of NFT geo-storage with multiple geo-spatial AR content anchored and minted NFTs and merged NFTs by aggregating NFTs of user-owned AR content within a perimeter, a defined circumference, or an area encapsulated within a circular boundary defined by a radial distance from a particular location point.

The preceding Summary is intended to serve as a brief introduction to some embodiments of the invention. It is not meant to be an introduction or overview of all inventive subject matter disclosed in this specification. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, and Drawings is needed. Moreover, the claimed subject matters are not to be limited by the illustrative details in the Summary, Detailed Description, and Drawings, but rather are to be defined by the appended claims, because the claimed subject matter can be embodied in other specific forms without departing from the spirit of the subject matter.

BRIEF DESCRIPTION OF THE DRAWINGS

Having described the invention in general terms, reference is now made to the accompanying drawings, which are not necessarily drawn to scale, and wherein:

FIG. 8 conceptually illustrates an electronic system with which some embodiments of the invention are implemented.

DETAILED DESCRIPTION

Figure 1:
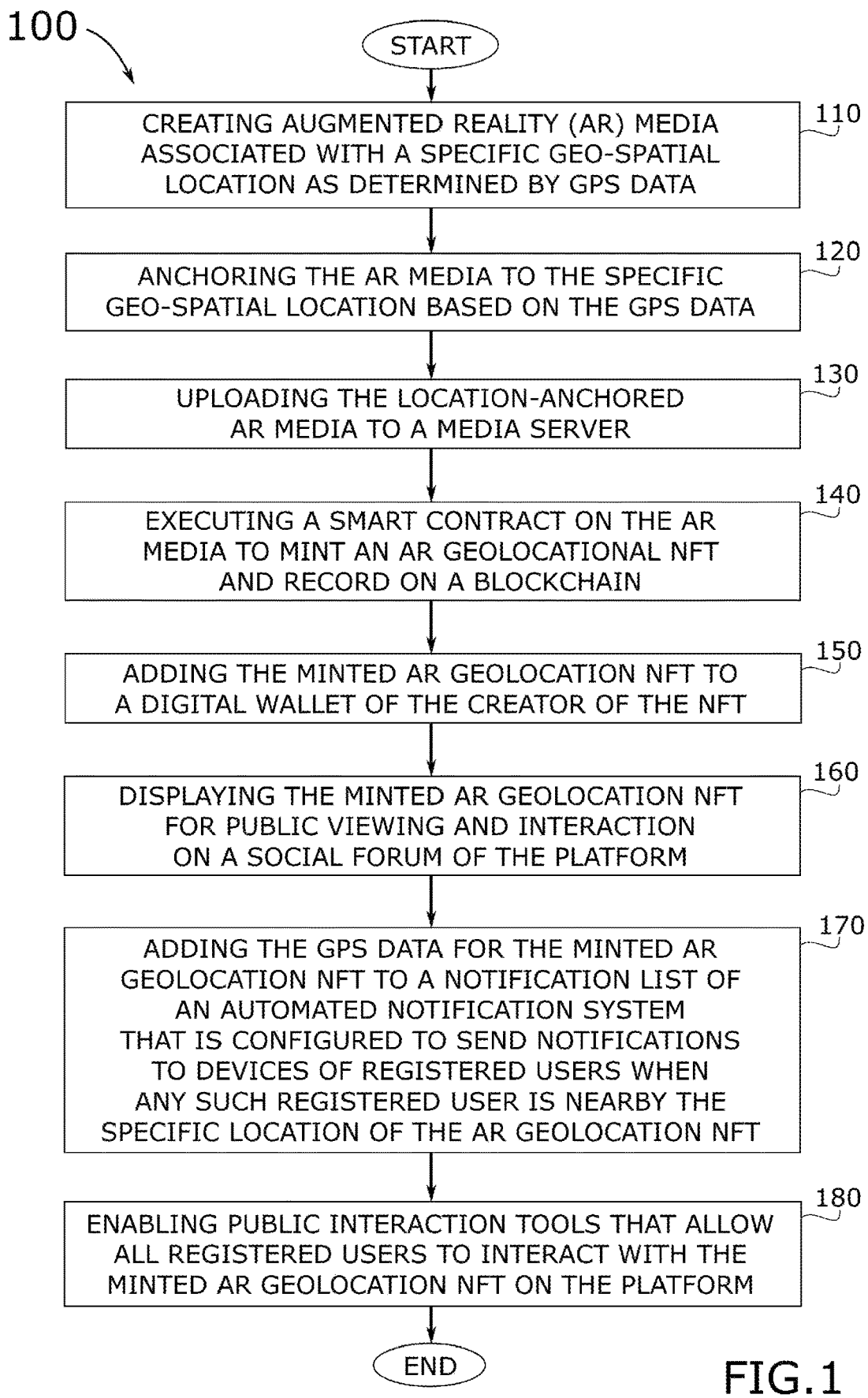
FIG. 1 conceptually illustrates a geo-spatial AR content anchoring and NFT minting process in some embodiments.

In the following detailed description of the invention, numerous details, examples, and embodiments of the invention are described. However, it will be clear and apparent to one skilled in the art that the invention is not limited to the embodiments set forth and that the invention can be adapted for any of several applications.

In this specification, the phrase "GPS location data" refers to location data received by a device of a user that is configured to receive location data from satellites of a global positioning system ("GPS").

Some embodiments provide a geo-spatial AR content anchoring and NFT minting system and associated processes for linking user-provided AR content to geo-spatial locations by NFT and blockchain technology. The AR content includes user-owned and user-created AR content including, without limitation, image(s), video(s), audio clip(s), etc. In some embodiments, the geo-spatial AR content anchoring and NFT minting system and associated processes support geo-minting and geo-storage on blockchain technology. In some embodiments, the geo-spatial AR content anchoring and NFT minting system comprises a geolocational AR content anchoring NFT minting and storage platform, a geolocational AR content anchoring NFT minting and storage user app through which users engage and interact with the geolocational AR content anchoring NFT minting and storage platform, a blockchain, a media server, and an automated notification system. In some embodiments, the geo-spatial AR content anchoring and NFT minting system further comprises a location indexing system.

In some embodiments, the associated geo-spatial AR content anchoring and NFT minting processes comprise (i) a geo-spatial AR content anchoring and NFT minting process, (ii) a cross-pollination process for combining, merging, or cross-pollinating smart contracts and content from a plurality of existing NFTs into a newly minted merged NFT on the blockchain, (iii) an autonomous evolutionary NFT modifier process for permanently changing visual or audible appearance of the NFT as it passes from one owner to another owner (for both newly minted geo-spatial AR content anchored and minted NFTs and cross-pollinated merged geo-spatial AR content anchored and minted NFTs), and (iv) a location indexing and re-addressing process for re-addressing of NFT geo-storage.

As stated above, as mass adoption approaches for the NFT web-based marketplace, the scarcity of an NFT will become less so, creating low consumer demand and ultimately driving down the intrinsic value of NFTs. Current NFT minting and purchasing platforms lack immersive software and hardware technologies and do not mint, data-store and/or transact on a geo-locational basis but rather utilize desktop and/or mobile websites, webapps and/or native apps. Embodiments of the geo-spatial AR content anchoring and NFT minting system and process for linking a user-owned AR content item to a particular geo-spatial location by NFT and blockchain technology described in this specification solve such problems by providing a mechanism for NFT geo-minting and NFT geo-storage that utilizes immersive software and hardware technologies at specific anchored geo-spatial locations to view, mint, interact with, and transact on the blockchain in real-time.

Embodiments of the geo-spatial AR content anchoring and NFT minting system and process for linking a user-owned AR content item to a particular geo-spatial location by NFT and blockchain technology described in this specification differ from and improve upon currently existing options. In particular, some embodiments differ by tying AR content and other immersive visual content (e.g., VR content, etc.) to a specific geo-spatical location by way of a blockchain that records geo-spatial coordinates that corresponds to a particular NFT owned by a particular user. The NFT is then anchored to the geo-spatial coordinates, such that ownership of the AR (or other immersive) content tied to the geo-spatial location is memorialized by the NFT, yet maintains relative anonymity of the user's name, address, and other human identifying characteristics since all records on the blockchain are encrypted and the NFT is a unique store of that ownership.

In addition, the geo-spatial AR content anchoring and NFT minting system and process for linking a user-owned AR content item to a particular geo-spatial location by NFT and blockchain technology immersive software and hardware technologies at the defined geo-spatial locations to view, mint, interact with, and transact on the blockchain in realtime. Of course, with mass adoption of NFTs due to increased accessibility to the internet, the market will become saturated and NFT value will slowly decline. However, this slow decline is mitigated through mobile devices and/or immersive hardware technology utilizing immersive software technology, whereby users can view, mint, interact with, collect, and/or transact on a geo-spatial location basis. For instance, in order to collect NFTs of personal interest, a user must be physically present at the geo-location where the NFT is located. However, unlike geo-caching of physical objects at geo-spatial locations, the items of interest in this disclosure are in the form of virtual objects, such as AR content, VR content, and/or other immersive content.

The geo-spatial AR content anchoring and NFT minting system and process for linking a user-owned AR content item to a particular geo-spatial location by NFT and blockchain technology of the present disclosure may be comprised of the following elements.

1. Mobile device, tablet computing device, wearables (such as smart watches, smart glasses, immersive goggles, etc.), and/or other immersive hardware computing technology.

2. Immersive software technology such as augmented reality, virtual reality and/or mixed reality.

3. A software-implemented process for minting NFTs on a blockchain and anchoring the NFTs to a specific geo-spatial location as recognized by GPS location data, conventional coordinate systems, or other manners of determining a distinct geo-spatial location.

4. A software-implemented process for storing NFTs at the specific geo-spatial locations (NFT geo-storage) in connection with a cloud application service that is communicably connected to the blockchain.

5. A software-implemented process for viewing and interacting with NFTs at their geo-spatial locations through immersive software and hardware technologies.

6. A software-implemented process for transacting and purchasing NFTs at their geo-spatial locations.

The various elements of the geo-spatial AR content anchoring and NFT minting system and process for linking a user-owned AR content item to a particular geo-spatial location by NFT and blockchain technology of the present disclosure may be related in the following exemplary fashion. It is not intended to limit the scope or nature of the relationships between the various elements and the following examples are presented as illustrative examples only.

Immersive software technology (2) is connected with hardware (1) giving the user the ability to geo-mint and geo-store their NFTs (3) (4) so that other users may view the NFT at its respective geo-spatial location (5) and purchase the NFT at the geo-spatial location where the NFT was minted and recorded on the blockchain (6).

The geo-spatial AR content anchoring and NFT minting system and process for linking a user-owned AR content item to a particular geo-spatial location by NFT and blockchain technology of the present disclosure generally works when a user arrives at a geo-spatial location. If viewing content, the geo-spatial location may be associated with AR content (or other immersive content) and corresponding NFT. If minting NFT, presence of the user at the geo-spatial location is sufficient for the user to start the geo-minting process. Specifically, through the user's mobile device, tablet, or other hardware technology, the immersive software runs to enable the user to instantly geo-mint and geo-store an NFT on the blockchain. NFT collectors and other users can view and collect the geo-minted NFT at the geo-spatial location by using their hardware technology and with immersive technology can view the geo-minted NFT at its respective geo-spatial location.

To make the geo-spatial AR content anchoring and NFT minting system and process for linking a user-owned AR content item to a particular geo-spatial location by NFT and blockchain technology of the present disclosure, a person would develop the software to implement the geo-minting and geo-storage processes. This would involve sending the global coordinates as a parameter of a smart contract or similar on-blockchain operation to be stored along with a newly minted NFT or similar feature on the blockchain. Further operations and interactions, such as queries or trades of NFTs, can likewise require coordinates, thereby creating a system that connects real-world locations with content stored on the blockchain.

By way of example, FIG. 1 conceptually illustrates a geo-spatial AR content anchoring and NFT minting process 100. As shown in this figure, the geo-spatial AR content anchoring and NFT minting process 100 starts when a creator user, on a geolocational AR content anchoring NFT minting and storage platform, creates AR media (referred to as "user-owned AR media") intended to be associated with a specific geo-spatial location (at 110). In some embodiments, the AR media is previously created AR media which the creator user selects from a user device via the geolocational NFT minting and storage user application. In some embodiments, the creator user is a registered user of the platform with a registered user profile that is configured to display the AR geolocational NFTs minted by the creator user.

Next, the AR geolocational geo-spatial AR content anchoring and NFT minting process 100 performs a step for anchoring (at 120) the user-owned AR media to the specific geo-spatial location based on the GPS location data determined by the user device. After the user-owned AR media is anchored to the specific geo-spatial location (now referred to as the "location-anchored AR media"), the AR geolocational geo-spatial AR content anchoring and NFT minting process 100 proceeds to the next step for uploading (at 130) the location-anchored AR media to a media server. In some embodiments, the creator user uploads the location-anchored AR media to the media server through a user interface of the geolocational NFT minting and storage user application.

In some embodiments, the AR geolocational geo-spatial AR content anchoring and NFT minting process 100 moves to the next step for executing a blockchain smart contract on the location-anchored AR media to mint an AR geolocational NFT and record the AR geolocational NFT on the blockchain (at 140). After minting and blockchain recording of the AR geolocational NFT is complete, the AR geolocational geo-spatial AR content anchoring and NFT minting process 100 of some embodiments then adds (or transmits) the minted AR geolocation NFT to a digital wallet of the creator user (at 150). Furthermore, the AR geolocational geo-spatial AR content anchoring and NFT minting process 100 visually outputs identifying information about the minted AR geolocation NFT in a social forum (at 160) of the geolocational AR content anchoring NFT minting and storage platform. In some embodiments, the identifying information about the minted AR geolocation NFT is visually output in the social forum in connection with the user profile of the creator user. In this way, viewers can ascertain who created and/or owns the minted AR geolocation NFT.

In some embodiments, the geo-spatial AR content anchoring and NFT minting process 100 transitions to the next step for adding the GPS location data and identifying information about the minted AR geolocation NFT to a notification list of an automated notification system (at 170). In some embodiments, the automated notification system is a component of the geo-spatial AR content anchoring and NFT minting system and is configured to send notifications to devices of registered users when any such registered user is nearby the specific location. In some embodiments, a notification that is received by a user device informs, prompts, or otherwise alerts the user to the existence of the minted AR geolocation NFT and its nearby location. Additionally, the geo-spatial AR content anchoring and NFT minting process 100 of some embodiments enables (at 180) a plurality of public interaction tools that allow registered users to interact with the minted AR geolocation NFT on the geolocational AR content anchoring NFT minting and storage platform. In some embodiments, the plurality of public interaction tools are enabled in the user interface of the geolocational NFT minting and storage user application. In some embodiments, the plurality of public interaction tools comprises a commenting tool configured to allow users to comment on the minted AR geolocation NFT, a bidding tool configured to allow users to make purchase bids to acquire the minted AR geolocation NFT, and a purchasing tool configured to allow users to purchase the minted AR geolocation NFT with or without bidding.

Figure 2:
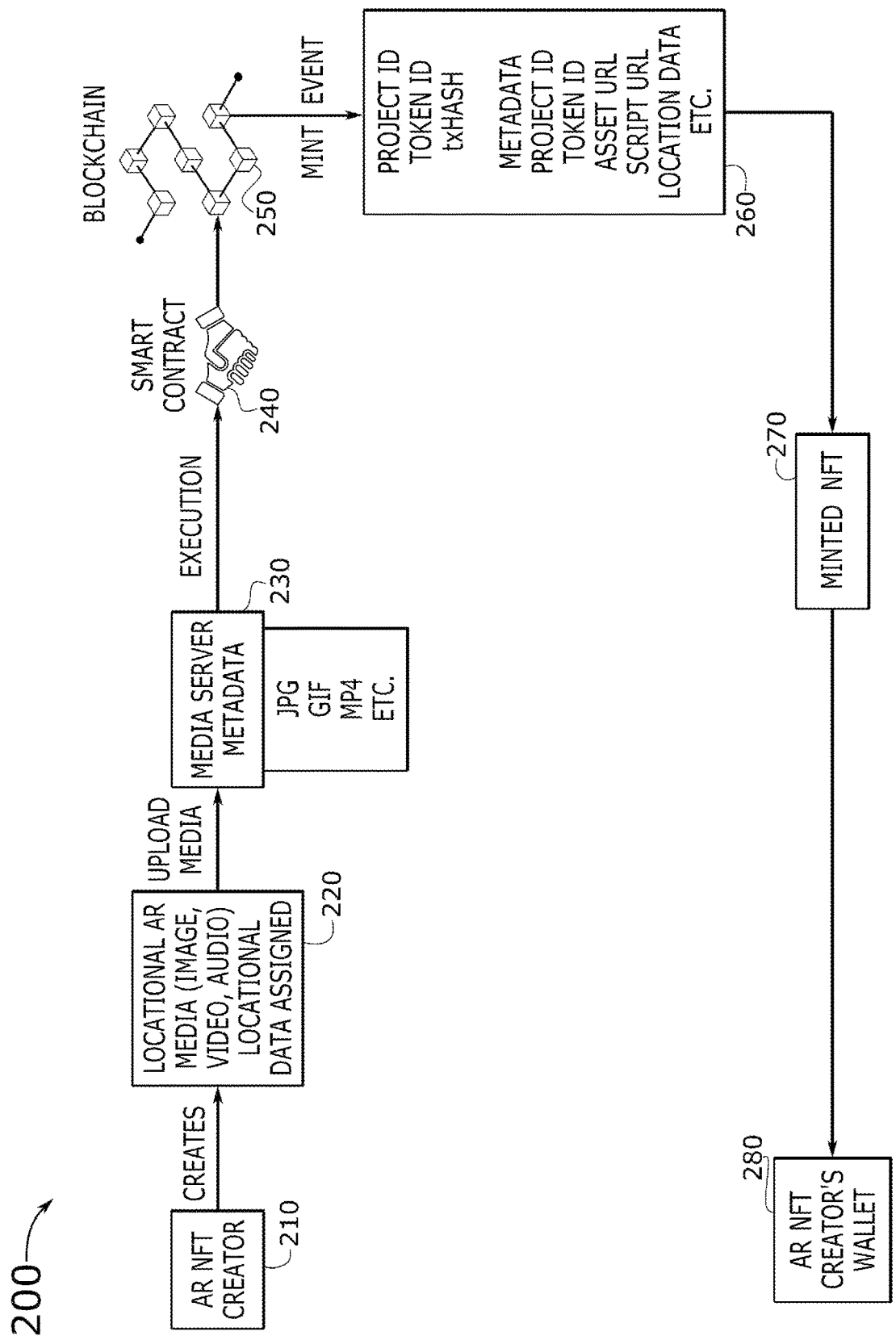
FIG. 2 conceptually illustrates an example of minting a new locational NFT with AR content that is anchored to a particular geo-spatial location in some embodiments.

In another view, FIG. 2 conceptually illustrates an example of minting a new locational NFT with AR content that is anchored to a particular geo-spatial location 200. As shown in this figure, this example of minting a new locational NFT with AR content that is anchored to a particular geo-spatial location 200 is based on actions performed by and/or between several components of the geo-spatial AR content anchoring and NFT minting system including an augmented reality (AR) NFT creator 210, locational AR media 220 (including image(s), video(s), and/or audio, etc.), a media server 230 configured to store content media and content metadata, a smart contract 240, a blockchain 250, blockchain recorded transaction data 260 of a newly minted geo-spatial AR content anchored and minted NFT 270, and a digital wallet 280 of the AR NFT creator 210 in which to reference the newly minted geo-spatial AR content anchored and minted NFT 270. Specifically, the AR NFT creator 210 creates locational AR media 220 to which location data is assigned (or anchored). The location-anchored AR media 220 is uploaded to the media server 230 along with metadata. Then the smart contract 240 is triggered to execute which mints the new locational NFT with AR content and records the newly minted locational NFT with AR content in the blockchain 250. When recorded in the blockchain 250, the newly minted locational NFT with AR content 270 is referenced by blockchain recorded transaction data 260 including, without limitation, a "Project ID", a "Token ID", a "txHash", and "metadata" which includes the Project ID, the Token ID, an asset URL, a script URL, location data (such as GPS coordinates), etc. Then the newly minted locational NFT with AR content 270 is transferred to the digital wallet 280 of the AR NFT creator 210.

To use the geo-spatial AR content anchoring and NFT minting system and process for linking a user-owned AR content item to a particular geo-spatial location by NFT and blockchain technology of the present disclosure, people will have the ability to create an NFT by capturing a video or photo in real time or by inserting artwork, digital artwork, image, video, motion graphics and any other media format onto the geolocational AR content anchoring NFT minting and storage platform. Other people can visit the NFT geo-spatial location, view the NFT and then purchase the NFT through the geolocational AR content anchoring NFT minting and storage platform using blockchain technology.

Figure 3:
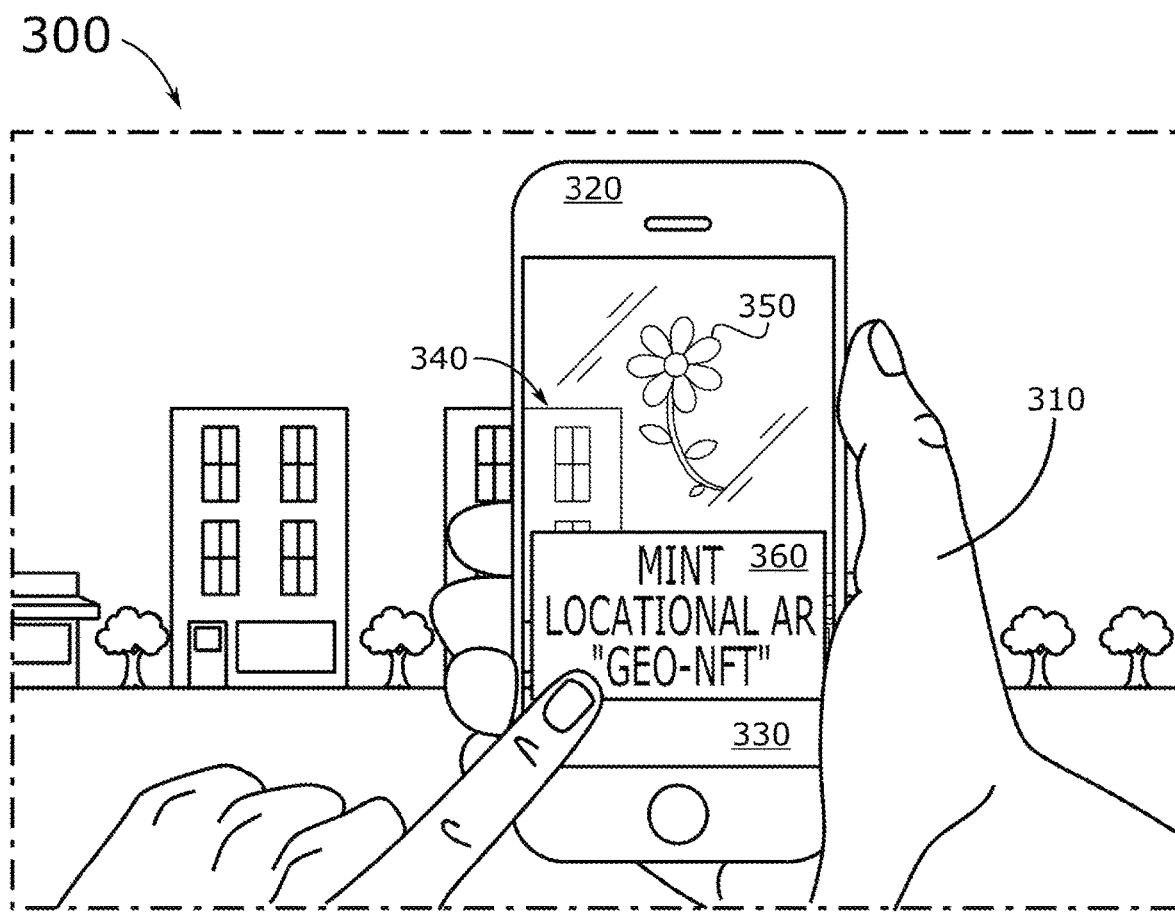
FIG. 3 conceptually illustrates a user interface (UI) of a geolocational AR content anchoring NFT minting and storage user application with a minting tool for a first user to create and mint a new locational NFT with AR content that is anchored to a particular geo-spatial location in some embodiments.

By way of example, FIG. 3 conceptually illustrates a user interface (UI) of a geolocational AR content anchoring NFT minting and storage user application with a minting tool for a first user to create and mint a new locational NFT with AR content that is anchored to a particular geo-spatial location 300. As shown in this figure, a first user 310 operates a first user device 320 and interacts with a user interface of a geolocational NFT minting and storage user application 330 that is visually output on a screen of the first user device 320 when the user interface of the geolocational NFT minting and storage user application is running on a processing unit of the first user device 320. Also, the first user device 320 is any device that includes hardware devices, such as GPS and camera, in support of determining location data of the device at any given moment and also configured to capture and/or view imagery visible in a field of view of the camera. Thus, the screen of the first user device 320 displays an image (which may be a video or moving/imagery) of a specific location 340. If the first user were to move the first user device 320 slightly to the left, or slightly to the right, the field of view of the camera for the first user device 320 would change, and the resulting imagery displayed on the screen for the specific location 340 would change. Also note that the first user has selected a particular AR content item 350 to apply as a layer transposed onto the view of the specific location 340 shown on the screen. If (and when) the first user is satisfied with the selected and applied AR content item 350 and its position with respect to the specific location 340, the first user may then select a minting tool 360 to create and mint a new locational NFT with AR content that anchors the AR content item 350 to the specific location 340. The smart contract processing is triggered by the geo-spatial AR content anchoring and NFT minting system to then record the newly minted locational NFT with AR content on the blockchain, as described above, by reference to FIGS. 1 and 2. After recorded to blockchain, the geo-spatial AR content anchoring and NFT minting system tracks and monitors status of the newly minted locational NFT with AR content to provide location notifications to registered users who are nearby the specific location 340 and perform other tracking and monitoring including, without limitation, purchase and exchange transactions, NFT merging actions, NFT evolutionary actions, and NFT re-addressing actions, if any. The following demonstrates a user receiving a notification of the location of the newly minted locational NFT with AR content, described next by reference to FIG. 4.

Figure 4:
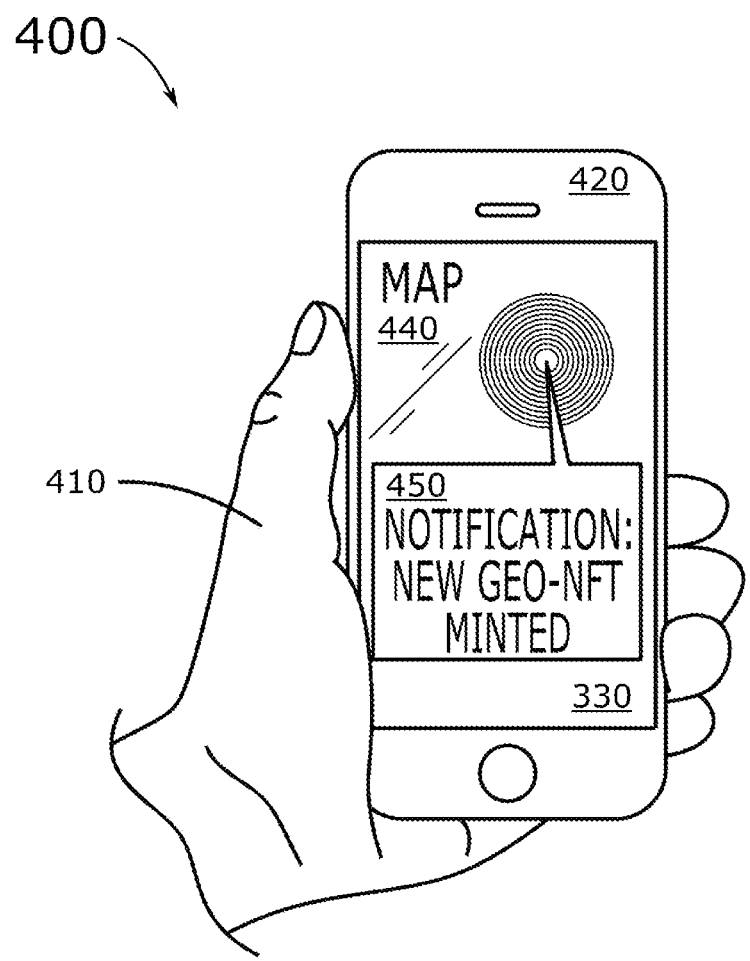
FIG. 4 conceptually illustrates the UI of the geolocational AR content anchoring NFT minting and storage user application showing a notification that alerts a second user to the location of the new locational NFT with AR content that is anchored to the particular geo-spatial location.

Specifically, FIG. 4 conceptually illustrates the UI of the geolocational AR content anchoring NFT minting and storage user application 330 running on a second user device 420 operated by a second user 410 and in which a location map 440 displayed on a screen of the second user device 420 highlights a specific map location and provides a notification 450 to alert the second user 410 of the location of the newly minted locational NFT with AR content 400. Now the second user 420 may go to the specific map location and view the AR content item 350 of the newly minted locational NFT at the specific location 340. This is demonstrated next, by reference to FIG. 5, which also provides an example of a purchasing tool that is configured to allow users to purchase locational NFTs.

Figure 5:
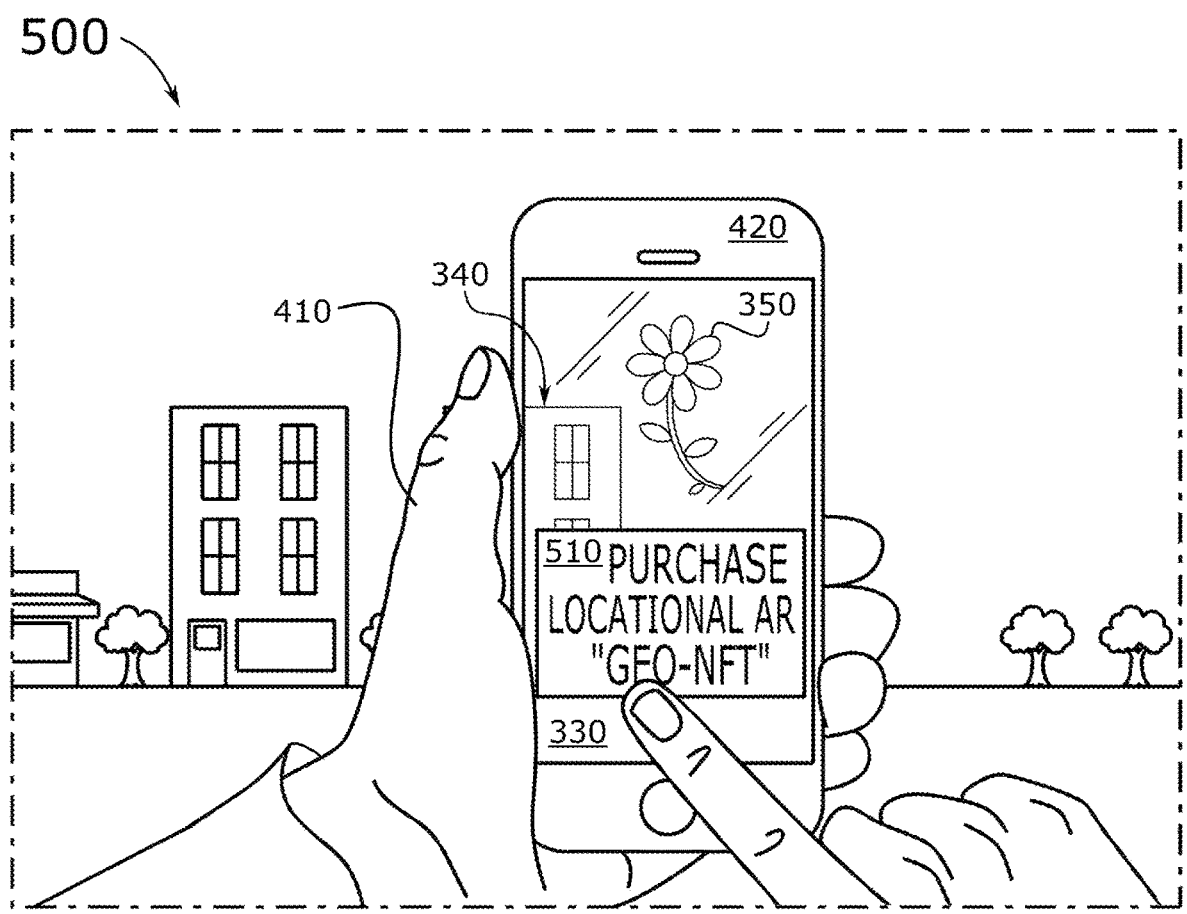
FIG. 5 conceptually illustrates the UI of the geolocational AR content anchoring NFT minting and storage user application with a purchasing tool that allows the second user to purchase the new locational NFT with AR content that is anchored to the particular geo-spatial location.

Specifically, FIG. 5 conceptually illustrates the UI of the geolocational AR content anchoring NFT minting and storage user application with a purchasing tool that allows the second user to purchase the new locational NFT with AR content that is anchored to the particular geo-spatial location 500. As shown in this figure, the second user 410 is now operating the second user device 420 at the specific location 340. Here, the geolocational AR content anchoring NFT minting and storage user application 330 is configured to overlay the particular AR content item 350 recorded for the newly minted locational NFT at the specific location 340. Also, the geolocational AR content anchoring NFT minting and storage user application 330 provides access to a purchasing tool 510 through which the second user 410 may purchase the newly minted locational NFT with its AR content item 350 anchored to the specific location 340.

While the examples of the user interfaces of the geolocational AR content anchoring NFT minting and storage user application 330 demonstrate aspects of minting, finding (via notification), and purchasing geolocational AR content anchored NFTs minted and recorded in the blockchain, a person of ordinary skill in the relevant art would appreciate that the user tools and interfaces may be designed in many different ways and are, therefore, not demonstrated in FIGS. 3-5 with an intention of limitation, but to exemplify possible usage.

In some embodiments, the geo-spatial AR content anchoring and NFT minting system supports merged NFTs. In some embodiments, a merged NFT is created by way of the cross-pollination process (also referred to as an "NFT merging process") for combining, merging, or cross-pollinating smart contracts and content from a plurality of existing NFTs into a newly minted merged NFT on the blockchain. In some embodiments, the NFT merging process applies to both geo-spatial AR content anchored and minted NFTs and conventional NFTs that are not necessarily anchored to a geolocation. This is described next, by reference to FIG. 6.

Figure 6:
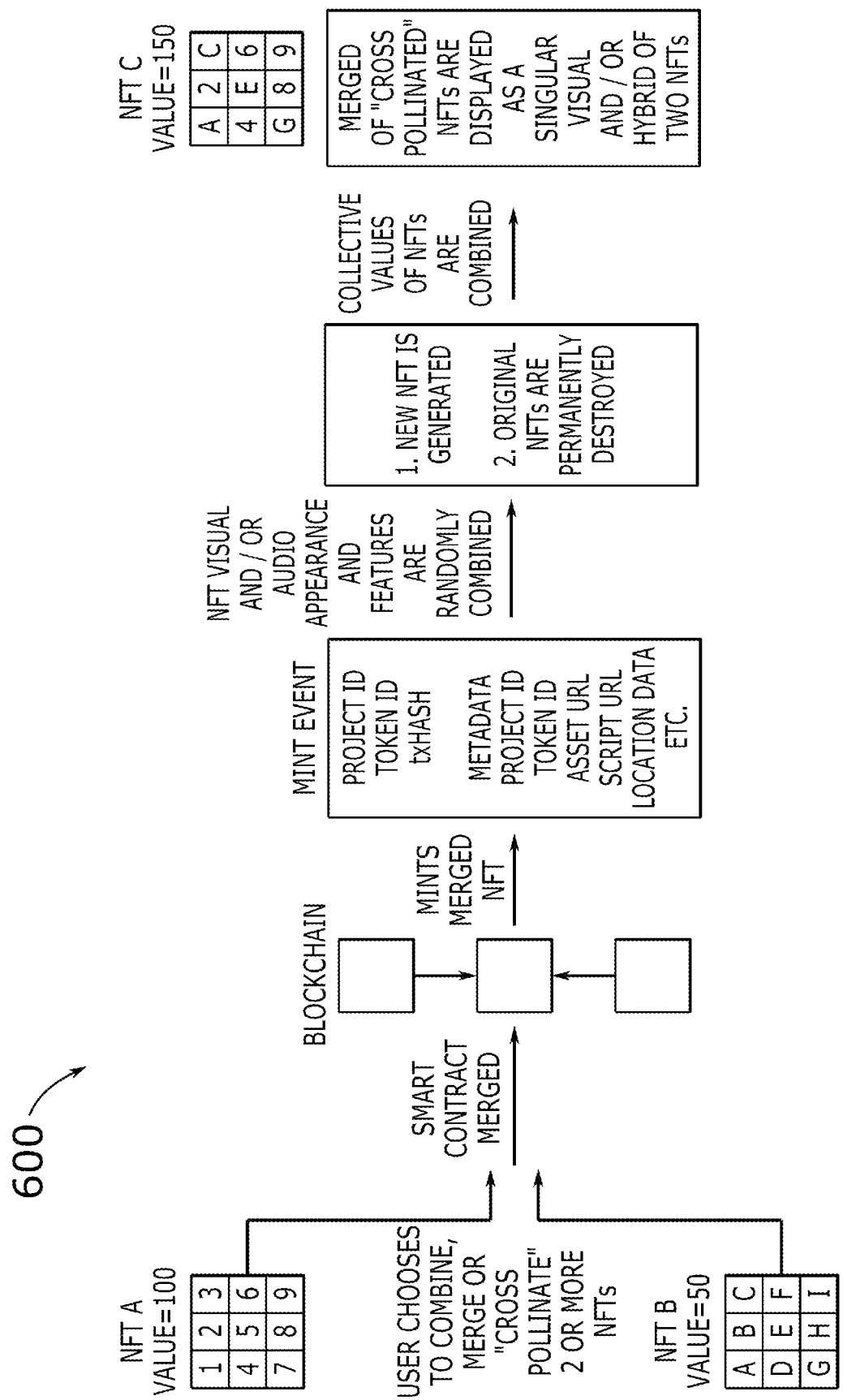
FIG. 6 conceptually illustrates an NFT merging process for combining, merging, or cross-pollinating smart contracts and content from a plurality of existing NFTs into a newly minted merged NFT on the blockchain in some embodiments.

Specifically, FIG. 6 conceptually illustrates an NFT merging process 600 for combining, merging, or cross-pollinating smart contracts and content from a plurality of existing NFTs into a newly minted merged NFT on the blockchain in some embodiments. As shown in this figure, the NFT merging process 600 starts with a user choosing to combine, merge, or cross-pollinate two more locational AR content-anchored NFTs minted for and recorded in the blockchain. Specifically, there are two NFTs shown in this example, namely, "NFT A" with a value of one hundred ("value=100") and "NFT B" with a value of fifty ("value=50"). By smart contract execution, NFT A and NFT B are merged and the blockchain records the merging transaction which results in a newly minted merged NFT. The transaction for the minting event includes key transaction data such as, without limitation, Project ID, Token ID, txHash (value, as an identifier), other metadata, an assert URL (if any), a script URL (if any) GPS location data (the specific location of the AR content as anchored to the location in the merged NFT), etc.

Next, the NFT merging process 600 of some embodiments moves ahead to feature display and sound aspects, which can be handled in either (or both) of two ways. A first way of handling feature display and sound aspects of the newly minted merged NFT involves randomly combining NFT visual appearance and/or audio sound and other features, thereby resulting in a new NFT being generated and the original NFTs (i.e., NFT A and NFT B) being permanently destroyed. In some embodiments, any of the NFT visual appearance features, audio sound features, or other experiential features of the NFT are randomly combined by an autonomous randomizer. In some embodiments, the autonomous randomizer performs a random feature combining algorithm. In some embodiments, the random feature combining algorithm is implemented as a software module and is based on a modified random number generator algorithm. In some embodiments, the autonomous randomizer comprises an artificial intelligence (AI) engine that is configured to intelligently randomize the mix of features presented for the NFT. Further details about the autonomous randomizer are described below.

The second way the NFT merging process 600 handles feature display and sound aspects of the newly minted merged NFT involves combining the collective values of the two or more NFTs (that is, NFT A and NFT B), which results in merged and cross-pollinated NFTs that are presented visually in a single combined visual view and audibly as a combined sound, and/or as a hybrid of these combinations (of the two NFTs). In this example, the resulting merged and cross-pollinated NFT is named "NFT C" with a value of one hundred fifty ("value=150").

Beyond merged and cross-pollinated NFTs, the geo-spatial AR content anchoring and NFT minting system of some embodiments supports evolutionary NFTs. In some embodiments, an evolutionary NFT is based on an original NFT that is changed by the autonomous evolutionary NFT modifier process for permanently changing visual or audible appearance of the NFT as it passes from one owner to another owner. In some embodiments, the autonomous evolutionary NFT modifier process applies to both geo-spatial AR content anchored and minted NFTs and merged NFTs. In some embodiments, the autonomous evolutionary NFT modifier process applies to conventional and existing NFTs that are not necessarily anchored to a geolocation. Details of evolutionary NFTs are described next, by reference to FIG. 7.

Figure 7:
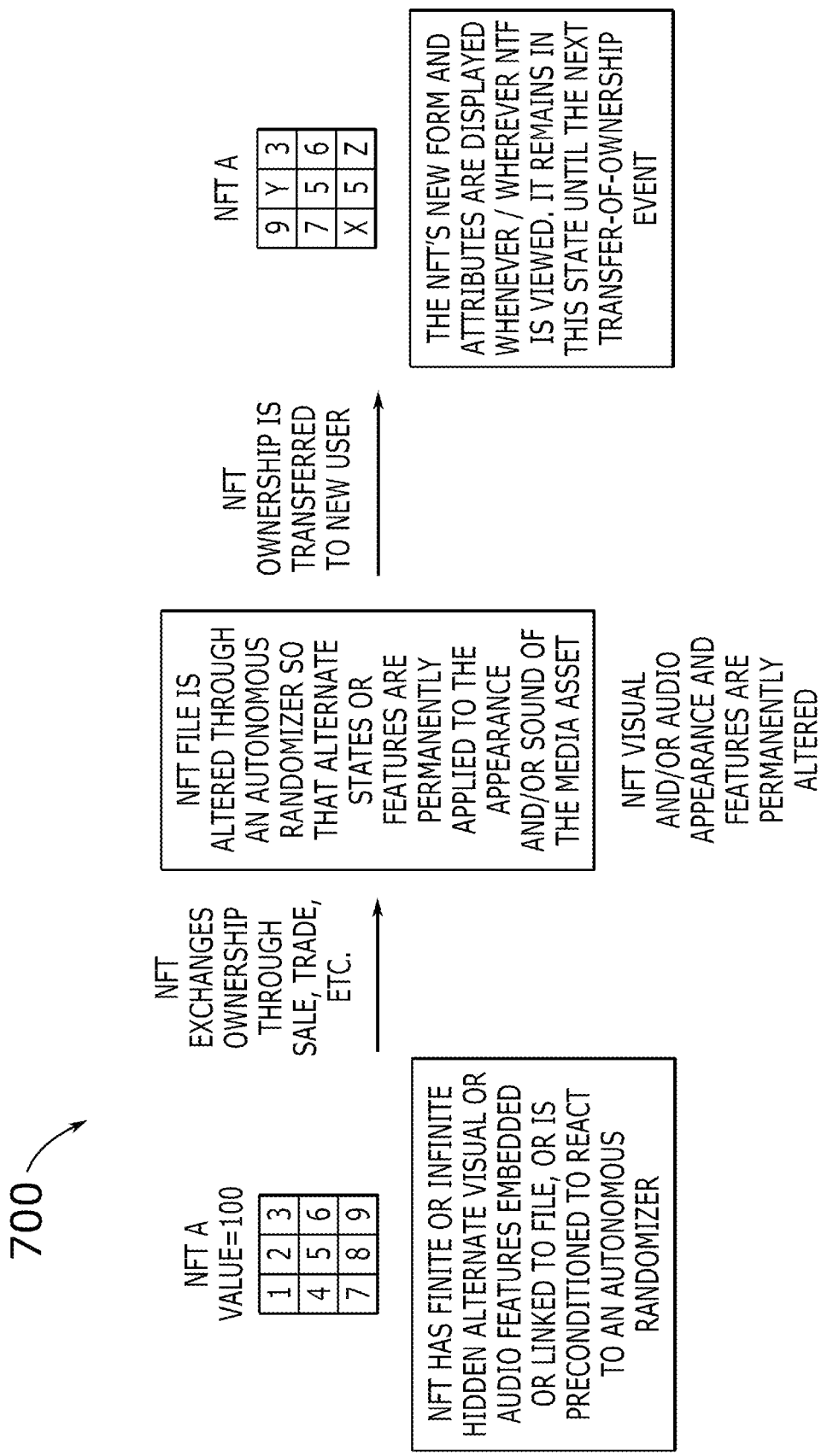
FIG. 7 conceptually illustrates an autonomous evolutionary NFT modifier process that permanently changes visual or audible appearance of the NFT as it passes from one owner to another owner in some embodiments.

Specifically, FIG. 7 conceptually illustrates an autonomous evolutionary NFT modifier process 700 that permanently changes visual or audible appearance of the NFT as it passes from one owner to another owner in some embodiments. As shown in this figure, the autonomous evolutionary NFT modifier process 700 evolves automatically when a particular NFT is exchanged and ownership changes via sale, trade, etc. In this example, the particular NFT is referred to as "NFT A" with a value of one hundred ("value=100"). While NFT A is demonstrated to a finite and fixed visual look (blocked numbers 1-9 as a representation), the truth is that NFT A may have finite or even infinite hidden alternate visual or audio features embedded in the NFT and/or linked to off-chain resources that store files, media, content, etc., associated with the appearance of the visual features and/or sound of the audio features. Furthermore, NFT A may be be preconditioned to react to an autonomous randomizer process that presents the features in arbitrary manners. Nevertheless, when NFT A is exchanged from a first user to a second user (again, by sale/purchase, exchange of NFTs or other exchanges, trades, etc.), the autonomous randomizer alters NFT A so that alternate states, features, values, output, etc., are permanently applied to the appearance and/or sound of the content/media asset(s) of NFT A.

After permanently altering the visual and/or audio features of NFT A (after the exchange from the first user to the second user), the autonomous evolutionary NFT modifier process 700 finalizes transference of ownership of NFT A to the second user. At this point, when the features of NFT A are viewed, listened to, or otherwise accessed, NFT A presents the features in the 'evolved' and changed form. In this example, the sequence of numbers 1-9 (from left to right, and top to bottom) in NFT A before the change in ownership has been permanently altered (by the autonomous randomizer) to present in an entirely different form (i.e., 9-Y-3-7-5-6-X-5-Z). Furthermore, the evolved features of NFT A involve more than a mere scrambling of the sequence demonstrated in NFT A before the change in ownership, since the features shown in NFT A after the change in ownership include (representational) letters, numbers (in duplicate, such as '5' and randomly disbursed, etc. This new form of NFT A will remain permanent until there is a subsequent change of ownership again. Such a subsequent change of ownership may involve the second user transferring ownership of NFT A to a third user, or even back to the first user. Either way, the autonomous evolutionary NFT modifier process 700 would trigger the autonomous randomizer to cause an evolution in the feature presentation of NFT A when ownership changes.

In addition to the processes described above, by reference to FIGS. 1-2 and 6-7, some other embodiments provide a location indexing and re-addressing process that is configured to perform re-addressing of NFT geo-storage by way of a location indexing system. In some embodiments, the location indexing and re-addressing process performs re-addressing of NFT geo-storage with multiple geo-spatial AR content anchored and minted NFTs and merged NFTs by aggregating NFTs of user-owned AR content within a perimeter, a defined circumference, or an area encapsulated within a circular boundary defined by a radial distance from a particular location point.

Many of the above-described features and applications are implemented as software processes that are specified as a set of instructions recorded on a computer readable storage medium (also referred to as computer readable medium or machine readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define specific machine implementations that execute and perform the operations of the software programs.

By way of example, FIG. 8 conceptually illustrates an electronic system 800 with which some embodiments of the invention are implemented. The electronic system 800 may be a computer, phone, PDA, or any other sort of electronic device. Such an electronic system 800 includes various types of computer readable media and interfaces for various other types of computer readable media. Electronic system 800 includes a bus 805, processing unit(s) 810, a system memory 815, a read-only memory 820, a permanent storage device 825, input devices 830, output devices 835, and a network 840.

The bus 805 collectively represents all system, peripheral, and chipset buses that communicatively connect the numerous internal devices of the electronic system 800. For instance, the bus 805 communicatively connects the processing unit(s) 810 with the read-only memory 820, the system memory 815, and the permanent storage device 825.

From these various memory units, the processing unit(s) 810 retrieves instructions to execute and data to process in order to execute the processes of the invention. The processing unit(s) may be a single processor or a multi-core processor in different embodiments.

The read-only-memory (ROM) 820 stores static data and instructions that are needed by the processing unit(s) 810 and other modules of the electronic system. The permanent storage device 825, on the other hand, is a read-and-write memory device. This device is a non-volatile memory unit that stores instructions and data even when the electronic system 800 is off. Some embodiments of the invention use a mass-storage device (such as a magnetic or optical disk and its corresponding disk drive) as the permanent storage device 825.

Other embodiments use a removable storage device (such as a floppy disk or a flash drive) as the permanent storage device 825. Like the permanent storage device 825, the system memory 815 is a read-and-write memory device. However, unlike storage device 825, the system memory 815 is a volatile read-and-write memory, such as a random access memory. The system memory 815 stores some of the instructions and data that the processor needs at runtime. In some embodiments, the invention's processes are stored in the system memory 815, the permanent storage device 825, and/or the read-only memory 820. For example, the various memory units include instructions for processing appearance alterations of displayable characters in accordance with some embodiments. From these various memory units, the processing unit(s) 810 retrieves instructions to execute and data to process in order to execute these processes.

The bus 805 also connects to the input and output devices 830 and 835. The input devices enable the user to communicate information and select commands to the electronic system. The input devices 830 include alphanumeric keyboards and pointing devices (also called "cursor control devices"). The output devices 835 display images generated by the electronic system 800. The output devices 835 include printers and display devices, such as liquid crystal displays (LCD) and organic light emitting diode (OLED) displays. Some embodiments include devices such as a touchscreen that functions as both input and output devices.

Finally, as shown in FIG. 8, bus 805 also couples electronic system 800 to a network 840 through a network adapter (not shown). In this manner, the computer can be a part of a network of computers (such as a local area network ("LAN"), a wide area network ("WAN"), or an intranet), or a network of networks (such as the Internet). Any or all components of electronic system 800 may be used in conjunction with the invention.

The functions described above can be implemented in digital electronic circuitry, in computer software, firmware or hardware. The techniques can be implemented using computer program products. Programmable processors and computers can be packaged or included in mobile devices. The processes may be performed by one or more programmable processors and by one or more sets of programmable logic circuitry. General and special purpose computing and storage devices can be interconnected through communication networks.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

The above-described embodiments of the invention are presented for purposes of illustration and not of limitation. While the invention has been described with reference to numerous specific details, one of ordinary skill in the art will recognize that the invention can be embodied in other specific forms without departing from the spirit of the invention. For instance, FIGS. 1-2 and 6-7 conceptually illustrate processes in which the specific operations of each process may not be performed in the exact order shown and described. Specific operations may not be performed in one continuous series of operations, and different specific operations may be performed in different embodiments. Furthermore, each process could be implemented using several sub-processes, or as part of a larger macro process. Thus, one of ordinary skill in the art would understand that the invention is not to be limited by the foregoing illustrative details, but rather is to be defined by the appended claims.

We claim:

1. A non-fungible token (NFT)-based augment reality (AR) content ownership and geo-spatial anchoring system comprising:

a computing device of a user, said computing device comprising one of a mobile device, a tablet computing device, a wearable device, and an immersive hardware computing technology device;

an immersive software system that runs on the computing device of the user to provide an immersive experience when viewing immersive content, said immersive experience comprising one of augmented reality, virtual reality, and mixed reality;

a blockchain that is communicably connected to a cloud application service and configured to store NFTs in connection with immersive content tied to geo-spatial locations;

a software program that is configured to mint NFTs on the blockchain and anchor the minted NFTs to a specific geo-spatial location as recognized by geo-spatial location data that distinctly identifies a specific geo-spatial location of the NFT, wherein the software program is further configured to store minted NFTs on the blockchain, wherein the software program is further configured to enable NFT transactions from one owner to another owner and write all ownership transactions to the blockchain; and an immersive software engaging application that is configured to allow a user to view and interact with NFTs when the user is present at the geo-spatial locations corresponding to the NFTs, wherein said viewing and interacting is performed through the immersive software system.

* * * * *